United States Patent [19]
McMurtrey

[11] Patent Number: 5,796,544
[45] Date of Patent: Aug. 18, 1998

[54] DISK DRIVE SYSTEM WHICH USES A COMMON DAC FOR DIGITAL POSITIONING CONTROL AND ANALOG POSITIONING CONTROL

[75] Inventor: David S. McMurtrey, Loveland, Colo.

[73] Assignee: Maxtor Corporation, Longmont, Colo.

[21] Appl. No.: 752,335

[22] Filed: Nov. 19, 1996

[51] Int. Cl.[6] .................................................. G11B 5/596
[52] U.S. Cl. ................................ 360/77.07; 360/77.02; 360/78.05
[58] Field of Search ........................... 360/77.02, 77.07, 360/78.04, 78.05, 78.14; 369/44.32, 44.29

[56] References Cited

U.S. PATENT DOCUMENTS

| 5,062,023 | 10/1991 | Squire | 360/78.04 |
| 5,077,716 | 12/1991 | Takeda et al. | 360/78.05 X |
| 5,119,250 | 6/1992 | Green et al. | 360/78.04 X |
| 5,329,409 | 7/1994 | Hampshire | 360/78.04 X |
| 5,602,693 | 2/1997 | Brunnett et al. | 360/77.02 X |

*Primary Examiner*—Aristotelis M. Psitos
*Assistant Examiner*—Larry T. Cullen

*Attorney, Agent, or Firm*—Sheridan Ross P.C.

[57] ABSTRACT

Provided is a disk drive with a disk and an actuator assembly on which a communication device is mounted for communication with the disk. Position information read from the disk is processed through a channel that generates an analog position error signal that is then converted to a digital position error signal by a first signal converter. Based on the digital position error signal, a controller determines whether realignment of the communication device with the disk is required. The operation of the first signal converter is only periodically required. When realignment is required, then a digital position control signal is generated by the controller and is then converted to an analog position control signal by a second signal converter, which shares circuitry with the first signal converter. Normally, the second signal converter is operating to realign the communication device. Therefore, the shared circuitry is normally operating as part of the second signal converter. Operation of the shared circuitry between the first signal converter and the second signal converter is switched by a switch controlled by the controller. Based on the analog position control signal, a servo system causes the actuator assembly to reposition the communication device for fine adjustment to maintain proper alignment with the disk.

12 Claims, 1 Drawing Sheet

1

DISK DRIVE SYSTEM WHICH USES A COMMON DAC FOR DIGITAL POSITIONING CONTROL AND ANALOG POSITIONING CONTROL

FIELD OF THE INVENTION

The present invention involves a disk drive, and particularly a disk drive with accurate and precise control of head tracking.

BACKGROUND OF THE INVENTION

A typical computer disk drive, such as a hard disk drive, has one or more magnetic disks with concentric tracks on which information is recorded. Information is read from and written to the disk with a head positioned adjacent to and aligned with a targeted track on the disk. Proper functioning of the disk drive requires that, during a reading or writing operation, the head be maintained with a proper alignment with respect to the track from which the information is being read or to which the information is being written. Maintaining proper alignment of the head with respect to a track is often referred to as head tracking.

Typically, head tracking is accomplished using positional information that is recorded at periodic locations on each track of the disk. The positional information can be read by the head and processed to determine whether the head is maintaining proper alignment with the desired track of the disk. When the positional information that is read indicates that the disk is moving out of the desired alignment, then the head is moved for realignment as necessary.

As disk technology advances and the density of information stored on a disk continues to increase, more precise head tracking is required because there is less permissible error for alignment between the head and disk. Circuitry for maintaining a proper alignment of a head with a track on a disk can become complex and add significantly to the overall expense of the disk drive, as well as taking up precious space within the disk drive. There is a continuing need for improved disk drive designs to maintain accurate and precise alignment of the head to facilitate proper reading and writing operations, especially as disk information storage density continues to increase.

SUMMARY OF THE INVENTION

The disk drive of the present invention has at least one disk with concentric tracks on which data may be stored. A communication device, such as a read and/or write head, is mounted on a actuator assembly in a manner to permit the communication device to be positioned at various locations relative to the disk so that the communication device may be aligned with any one of a number of the concentric tracks on the disk.

During operation of the disk drive, the communication device is positioned adjacent to and aligned with a track of interest for a read or a write operation. When information is read from the disk by the communication device, at least a portion of that information is positional information recorded on the disk. The positional information is transmitted from the communication device to a channel where the position information is distinguished from other information that may have also been read by the communication device. Based on position information detected in the channel, the channel generates an analog position error signal relating to error in the alignment of the communication device relative to the disk as compared to some standard alignment criteria.

2

A first signal converter takes the analog position error signal and converts it to a digital position error signal, which is then processed through a controller to determine whether repositioning of the communication device is required for proper alignment with the targeted track of the disk. When the controller determines that repositioning of the communication device is required, then the controller generates a digital position control signal.

The digital position control signal is converted to an analog position control signal by a second signal converter. The first signal converter and the second signal converter, however, do not operate simultaneously. Only one is in operation at any given time. In addition to generating the digital position control signal, the controller also operates a switch that switches a connection between the first signal converter and the second signal converter, as required. This switching permits the first signal converter and the second signal converter to share circuitry, significantly reducing space requirements on an integrated circuit and, accordingly, significantly reducing the cost associated with accurate tracking of the proper alignment between the communication device and a track on the disk.

The analog position control signal outputted by the second signal converter is processed by a servo system that supplies a signal to the actuator assembly to cause repositioning of the communication device to maintain proper alignment of the communication device with the desired track on the disk.

DETAILED DESCRIPTION

Figure 1:
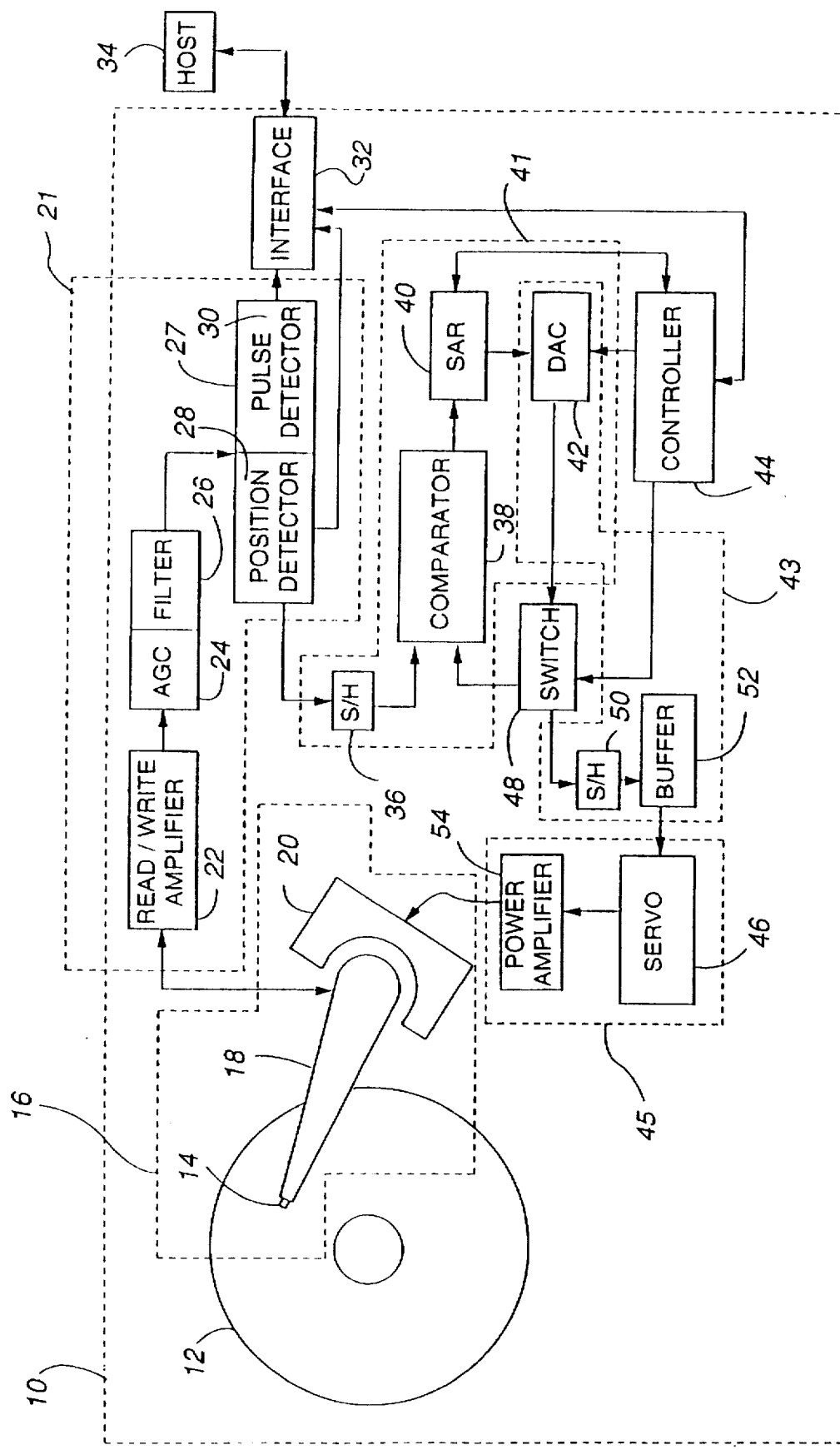
FIG. 1 is a schematic of an embodiment of the disk drive of the present invention.

Referring to FIG. 1, disk drive 10 includes a disk 12 for storing information. The disk 12 is typically a hard disk capable of storing magnetic information on concentric tracks.

An actuator assembly 16 permits communication with the disk 12. The actuator assembly 16 includes a communication device 14 for transmitting information to the disk 12 for storing in a write mode and for receiving information from the disk 12 in a read mode. The communication device 14 comprises a magnetic transducer for reading magnetically stored information from a magnetic disk. The communication device 14 is supported adjacent to the disk 12 by a movable suspension mechanism 18, which includes one or more members structurally extending in a suspended fashion adjacent to the disk 12. As shown in FIG. 1, the suspension mechanism 18 is mounted to permit pivotal movement of the suspension mechanism 18 to permit positioning of the communication device 14 for communication with any desired track on disk 12. A driver 20 drives movement of the actuator mechanism 18 for repositioning of the communication device 14. The driver 20 is typically a motor, such as a voice coil motor.

A channel 21 receives information from the communication device 14 during operation of the disk drive 10 and processes the information, as appropriate, to an interface connected to a host computer and/or to a controller 44. The channel 21 includes a read/write amplifier 22, an automatic gain control (AGC) 24, a filter 26, and a detector 27, which includes a position detector 28 and a pulse detector 30.

A first signal converter 41 is used to convert an analog signal from the channel to a digital signal. The first signal converter includes a sample and hold device 36, a comparator 38, a serial approximation register (SAR) 40 and a digital-to-analog converter (DAC) 42.

The controller 44 controls the positioning of the communication device 14 relative to the disk 12. The output from the controller 44, used to control positioning of the communication device 14, is converted from a digital signal to an analog signal by a second signal converter 43. The second signal converter 43 includes the DAC 42, a sample and hold device 50 and an output buffer 52. The circuitry of the DAC 42 thus dually functions as part of the first signal converter 41 and the second signal converter 43. This dual functionality saves a significant amount of space relative to disk drive designs that use a separate DAC for each of analog-to-digital signal conversion and digital-to-analog signal conversion. A switch 48 is provided to alternately connect the DAC 42 between operation as part of the first signal converter 41 and part of the second signal converter 43. Based on output from the controller, a servo system 45 directs the actuator assembly 16 to reposition the communication device 14, when realignment of the communication device 14 relative to the disk 12 is required. The servo system 45 includes a servo unit 46 and a power amplifier 54.

With continued reference to FIG. 1, operation of the disk drive 10 is now described for a read operation. During a read operation, the communication device 14 is positioned at a desired location adjacent to the disk 12 to permit communication with a target track on the disk 12 so that information may be read from the target track. Preferably, alignment of the communication device 14 with the disk 12 is maintained so that the communication device 14 remains positioned directly over the center of the target track. Read information that is read by the communication device 14 from the disk 12 is transmitted to the channel 21 where it is amplified by the read/write amplifier 22 and transmitted as an analog signal to the AGC 24. The AGC 24 controls the magnitude of the read signal and outputs a signal having a desired amplitude for proper operation of the detector 27. Between the AGC 24 and the detector 27, the output signal from the AGC 24 passes through a filter 26, which removes high-frequency noise from the signal.

The signal from the filter 26 is transmitted to a detector 27. The pulse detector 30 detects information for communication to the host interface 32, and ultimately to a host 34, concerning the direction of movement of the communication device 14. The position detector 28 detects position information that the communication device 14 has read from the disk 12. The position information, often referred to as servo information, is embedded in user data or other data that is stored on the disk 12 and read by the communication device 14. The embedded position information includes coarse position information that includes the track address on the disk 12 adjacent to the communication device 14 and also includes fine position information corresponding to the precise positioning of the communication device 14 relative to the track on the disk 12. The coarse position information is used to control gross positioning of the communication device 14 relative to the disk 12 and is transmitted to the host interface 32 and subsequently to the host 34 for processing.

Based on fine position information detected by the position detector 28, the position detector transmits an analog position error signal (PES) to the controller. The analog PES from the position detector 28 goes to the first signal converter 41. In the first signal converter 41, the sample and hold device 36 isolates and stores the analog PES signal before transmitting it to the comparator 38. The sample and hold device 36 typically comprises a capacitor. The SAR 40 and the DAC 42 convert the analog PES signal to a digital PES signal.

Conversion of an analog signal to a digital signal is a well known operation. In the first signal converter 41, the SAR 40 creates an approximation signal by setting the most significant bit to a "1" with other bits being "0". This approximation signal is transmitted to the DAC 42 where it is converted from a digital signal to an analog approximation signal. The analog approximation signal is transmitted to the comparator 38 where it is compared with the analog PES signal from the position detector 28. If the analog approximation signal is larger than the analog PES, the "1" is removed from the most significant bit and replaced with a "0". When the analog PES is larger than the analog approximation signal, a "1" remains in the most significant bit. A "1" is tested sequentially for each of the remaining bits in like fashion. Ultimately all bits have been set to obtain a binary equivalent of the analog PES.

After the PES signal has been converted from an analog signal to a digital signal, the digital PES signal is then transmitted from the SAR 40 to the controller 44, which controls timing and operation of the elements in system 10. The controller 44 receives information (I/O requests) from a host 34 through interface 32 and carries out each request from the host 34 by delivering appropriate commands to the servo system 45. The controller 44 also processes the digital PES signal to determine whether the communication device 14 is moving off the targeted track and needs to be repositioned for proper communication. When the magnitude of the digital PES signal indicates that the communication device 14 needs fine adjustment of position, the controller 44 transmits a digital control signal to the DAC 42, which then operates as part of the second signal converter 43.

Occasionally, however, the switch 48 is temporarily repositioned so that is connected as part of the first signal converter 41 to convert the analog PES signal to the digital PES signal. For example, the switch may temporarily be positioned to permit operation of the DAC 42 as part of the signal converter for several microseconds about every 150 microseconds. Positioning of the switch, determines whether the circuitry of the DAC 42 is functioning as part of the first signal converter 41 or the second signal converter 42. The first signal converter and the second signal converter cannot operate simultaneously.

When operating as part of the second signal converter 43, the DAC 42 converts the digital control signal from the controller 44 to an analog control signal. The analog control signal is transmitted through the switch 48 to the sample and hold device 50, which is typically a capacitor.

Periodically, the controller 44 directs the switch 48 to connect the output from the DAC 42 to the comparator 38 for operation of the DAC 42 as part of the first signal converter 41. After the analog to digital conversion has taken place, then the controller 44 directs the switch 48 to reconnect the DAC 42 output for operation of the DAC 42 as part of the second signal converter 43.

The analog control signal is transmitted from the sample and hold device 50 to an output buffer 52 which acts as a unity gain amplifier and isolates the sample and hold device 50 from the servo system 45. The analog control signal goes to the servo system 45, where the servo control unit 46 receives the analog control signal and outputs a servo correction voltage signal, with a voltage that is proportional to the amount of current needed to correct the current flowing through the motor 20. The power amplifier 54 converts the servo correction voltage to a servo current that is transmitted to actuator assembly 16 to cause the driver 20 to move the suspension mechanism 18. When the suspension mechanism 18 is moved, the communication device 14 is thereby repositioned relative to the disk 12 for fine adjustment.

Although the present invention has been described with a magnetic information storage disk, the same principles as discussed above also are applicable to a disk drive having an optical disk, making the necessary modifications to accommodate optical storage and reading of information. For example, the communication device could comprise a laser for optically reading information from an optical disk.

Also, although the disk drive has been described with reference only to a single disk, the disk drive may have multiple storage disks, with information storage capacity on one or both sides of each disk. Also, although described primarily for a hard disk drive, the disk drive of the present invention could be embodied in a floppy disk drive with a removable floppy disk. Furthermore, the disk could be a read-only-memory disk or a disk with both read and write capability.

The mechanical configuration and operation of the actuator assembly may be of any design capable of positioning the communication device over the proper position on the disk. For example, the suspension mechanism could be translationally moveable rather than pivotally moveable for positioning of the communication device.

The circuitry for any of the electronic components described with respect to FIG. 1 may be any circuitry that accomplishes the particular electronic function. Furthermore, while various embodiments of the present invention have been described in detail, it is apparent that modifications and adaptations to those embodiments will occur to those skilled in the art. It is to be expressly understood that such modifications and adaptations are within the scope of the present invention.

What is claimed is:

1. A disk drive comprising:

a data storage disk for storing data;

a communication device for communicating with said disk to read data from said disk, said data including position data stored on said disk identifying locations on said disk;

a channel, electrically connected with said communication device, for electrically receiving said position data read by said communication device and generating an electrical analog position error signal corresponding to a position of said communication device relative to a preselected location on said disk;

a first signal converter, electrically connected with said channel, for converting said analog position error signal to a digital position error signal, wherein said first signal converter includes a digital-to-analog converter for converting a digital approximation of said analog position error signal to an analog approximation for comparison with said analog position error signal to determine when said digital approximation has sufficient accuracy for use as said digital position error signal;

a controller, in electrical connection with said first signal converter, for processing said digital position error signal to determine whether repositioning of said communication device is required relative to said disk and for generating a digital position control signal for controlling repositioning of said communication device when said controller determines that repositioning of said communication device is required;

a second signal converter, in electrical connection with said controller, for converting said digital position control signal to an analog position control signal, wherein said second signal converter includes said digital-to-analog converter, said digital to analog converter operating as part of said first signal converter and as part of said second signal converter;

a servo system, in electrical connection with said second signal converter, for directing repositioning of said communication device based on said analog position control signal when said controller determines that repositioning of said communication device is required;

a driver, in electrical connection with said servo system, for driving repositioning of said communication device relative to said disk in response to a direction electrically received from said servo system; and a switch to switch electrical connection of said digital-to-analog converter between operable connection as part of said first signal converter for generating said digital position error signal and operable connection as part of said second signal converter for generating said analog position control signal.

2. A disk drive, as claimed in claim 1, wherein:

said disk comprises a magnetic storage medium.

3. A disk drive, as claimed in claim 1, wherein:

said disk comprises a removable floppy disk.

4. A disk drive, as claimed in claim 1, wherein:

said disk comprises an optical storage medium.

5. A disk drive, as claimed in claim 1, wherein:

said communication device is supported by a member that is movable relative to said disk for positioning said communication device relative to said disk; and said driver is operatively connected with said member such that driving of said driver causes repositioning of said member and said communication device relative to said disk.

6. A disk drive, as claimed in claim 5, wherein:

said driver comprises an electrically driven motor.

7. A disk drive, as claimed in claim 5, wherein:

said driver comprises a voice coil motor.

8. A disk drive, as claimed in claim 1, wherein:

said channel separates other data from said position data for communication of said other data to a host computer and generates said analog position error signal from said position data.

9. A disk drive, as claimed in claim 1, wherein:

when said disk drive is operating, said switch is set so that said digital-to-analog converter is normally electrically connected to operate as part of said first signal converter and said controller occasionally temporarily switches said switch so that said digital-to-analog converter temporarily is electrically connected to operate as part of said second signal converter when repositioning of said communication device is determined to be required by said controller.

10. A disk drive, as claimed in claim 1, wherein:

said preselected location on said disk is a concentric data track of said disk;

when said controller determines that repositioning of said communication device is required, said switch switches output from said digital-to-analog converter from said first signal converter to said second signal converter for generation of said analog position control signal; and when said analog position control signal is generated by said second signal converter, said switch thereafter switches output of said digital-to-analog converter back to said first signal converter.

11. A disk drive, as claimed in claim 1, wherein:

said first signal converter includes a first sample and hold for sampling and holding said analog position error signal and said second signal converter includes a second sample and hold for sampling and holding said analog position control signal.

12. A disk drive comprising:

a data storage disk for storing data;

a head associated with the disk for reading data therefrom, said data including position data for identifying a position of the head relative to the disk;

a channel for receiving said position data and for generating an analog position error signal corresponding to the position of the head relative to a predetermined location on said disk;

a first signal converter for converting said analog position error signal to a digital position error signal, wherein said first signal converter includes a digital-to-analog converter;

a controller for processing said digital position error signal and for generating a digital position control signal to reposition the head relative to the disk;

a second signal converter for converting said digital position control signal to an analog position control signal, wherein said second signal converter includes said digital-to-analog converter;

a servo system, electrically connected to said second signal converter, for directing repositioning of said head based on said analog position control signal;

a driver, in electrical connection with said servo system, for driving repositioning of the head relative to said disk in response to a direction received from said servo system; and a switch for connecting said digital-to-analog converter to said first signal converter when converting said analog position error signal to a digital position error signal and for connecting said digital-to-analog converter to said second signal converter when converting said digital position control signal to an analog position control signal.

* * * * *